(12) United States Patent
Suzuki et al.

(10) Patent No.: US 7,781,236 B2
(45) Date of Patent: Aug. 24, 2010

(54) OPTICAL ELEMENT MOUNTING METHOD AND OPTICAL ELEMENT MOUNTING DEVICE

(75) Inventors: Toshihiko Suzuki, Kanagawa (JP); Shigemi Ohtsu, Kanagawa (JP); Keishi Shimizu, Kanagawa (JP); Kazutoshi Yatsuda, Kanagawa (JP); Akira Fujii, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 118 days.

(21) Appl. No.: 12/060,928

(22) Filed: Apr. 2, 2008

(65) Prior Publication Data

US 2009/0068766 A1 Mar. 12, 2009

(30) Foreign Application Priority Data

Sep. 12, 2007 (JP) ............................. 2007-236415

(51) Int. Cl.
*H01L 21/66* (2006.01)

(52) U.S. Cl. ............................. 438/15; 438/22; 438/29; 438/31; 438/33; 257/678; 257/680; 257/686; 257/705; 257/728; 257/E21.53

(58) Field of Classification Search ....................... None
See application file for complete search history.

(56) References Cited

U.S. PATENT DOCUMENTS 5,146,082 A * 9/1992 Abe ......................... 250/227.2
7,574,085 B2 * 8/2009 Hirose ......................... 385/49

FOREIGN PATENT DOCUMENTS

JP 2007-017559 A 1/2007

\* cited by examiner

*Primary Examiner*—N Drew Richards
*Assistant Examiner*—Kyoung Lee
(74) *Attorney, Agent, or Firm*—Sughrue Mion, PLLC

(57) ABSTRACT

An optical element mounting method includes: illuminating ultraviolet light onto a polymer optical waveguide device; under the ultraviolet light illumination, capturing, by an image pickup device, the polymer optical waveguide device including a light incident/exiting position of a waveguide core; and judging, from a difference between bright and dark in a captured image, that a portion brighter than other portions or a portion darker than other portions is the light incident/exiting position of the waveguide core.

14 Claims, 9 Drawing Sheets

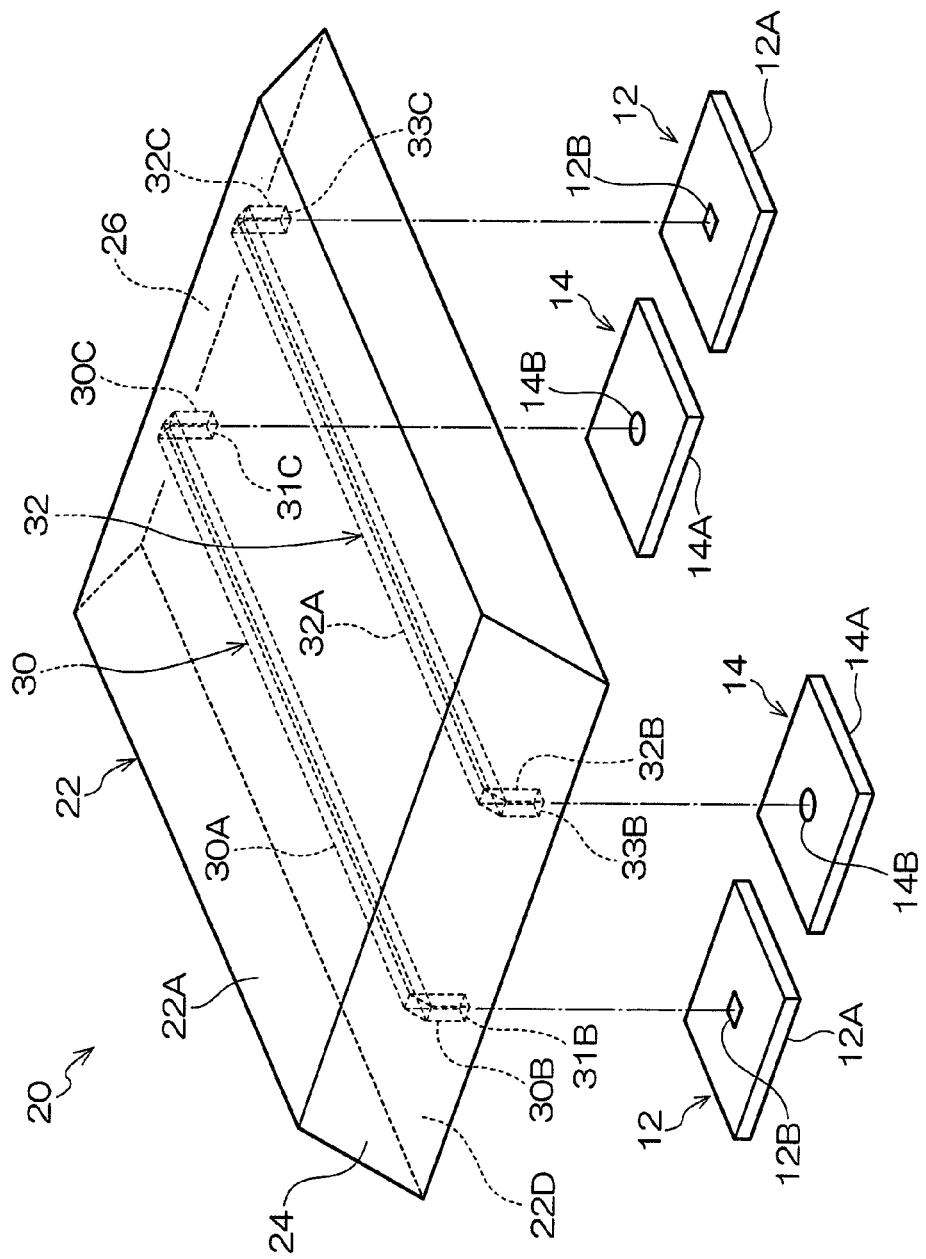

OPTICAL ELEMENT MOUNTING METHOD AND OPTICAL ELEMENT MOUNTING DEVICE

CROSS-REFERENCE TO RELATED APPLICATION

This application is based on and claims priority under 35 USC 119 from Japanese Patent Application No. 2007-236415 filed Sep. 12, 2007.

BACKGROUND

1. Technical Field

The present invention relates to an optical element mounting method for mounting an optical element, such as a light-emitting element, a light-receiving element, or the like, to a optical waveguide, and relates to an optical element mounting device for implementing the optical element mounting method.

2. Related Art

Accompanying the improvements in the processing capabilities of computers in recent years, the problem of a "wiring bottleneck" has arisen in which the electrical wires of the computer or between various devices limit the performance of the overall system. Attention has focused on short-distance optical wiring (optical interconnections) within a device or between devices or the like, as a means for solving wiring bottlenecks. In order to realize optical interconnections, optical technologies which are economical as compared with the telecommunications field are required, and the lowering of costs of both the structural parts and the mounting method has become an issue to be addressed.

In methods for mounting optical elements such as light-emitting elements, light-receiving elements, or the like to optical waveguides, in order to align the optical elements, there is mounting by active alignment in which alignment is carried out by driving the optical elements and observing the optical input strengths, and mounting by passive alignment in which alignment is carried out by using, as guides, position identifying marks which are provided for the optical parts. With active alignment, the light incident/exiting positions of the waveguide can be judged accurately, but the costs are high. On the other hand, with passive alignment, the light incident/exiting positions which are inferred as relative positions from the position identifying marks, do not always coincide with the actual optical axis, and the efficiency of accurate optical coupling is low.

SUMMARY

An optical element mounting method of a first aspect of the present invention is an optical element mounting method that mounts an optical element structured so as to include at least one of a light-emitting element and a light-receiving element to a polymer optical waveguide device having a waveguide core that guides light and a cladding portion surrounding the waveguide core, the method including: illuminating ultraviolet light onto the polymer optical waveguide device; in a state in which the ultraviolet light is illuminated, capturing, by an image pickup device, the polymer optical waveguide device including a light incident/exiting position of the waveguide core; and judging, from a difference between bright and dark in a captured image, that a portion brighter than other portions or a portion darker than other portions is the light incident/exiting position of the waveguide core, and placing at least one of the light-emitting element and the light-receiving element at the light incident/exiting position of the waveguide core, and mounting the optical element.

In the optical element mounting method of the first aspect of the present invention, ultraviolet light is illuminated onto the polymer optical waveguide device at which the waveguide core is formed. The illuminated ultraviolet light is scattered or excited within the polymer optical waveguide device, and propagates through the waveguide core and the cladding portion surrounding the waveguide core, and exits from an end portion of the waveguide which includes the light incident/exiting position. In a case in which the scattering and excitation due to the illumination of the ultraviolet light occur mainly at the material forming the waveguide core portion, the light due to this scattering and exciting is emitted from the light incident/exiting position of the waveguide core end portion. On the other hand, in a case in which the scattering and excitation due to the illumination of the ultraviolet light occur mainly at the waveguide cladding portion, the light is emitted from the waveguide end portion except for the light incident/exiting position. Thus, in a state in which the ultraviolet light is illuminated, the polymer optical waveguide device including this incident/exiting position is captured by the image pickup device. By capturing the exiting light by the image pickup device, a portion which is brighter than or a portion which is darker than other portions in the captured image can be judged as the incident/exiting position.

BRIEF DESCRIPTION OF THE DRAWINGS

An exemplary embodiment of the present invention will be described in detail based on the following figures, wherein:

FIG. 1 is a perspective view showing a polymer optical waveguide device of a present exemplary embodiment, and light-emitting sections and light-receiving sections;

DETAILED DESCRIPTION

Figure 9A:
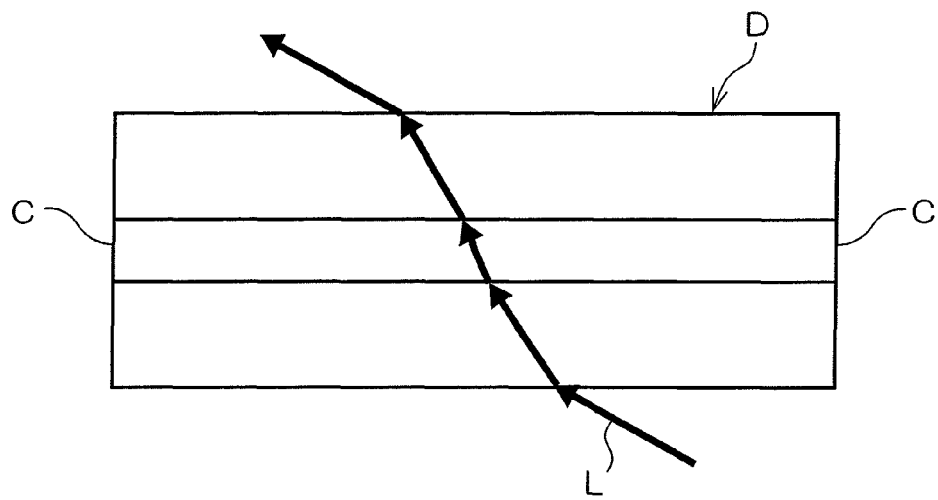
FIG. 9A is a drawing schematically showing a case in which visible light is illuminated onto an optical waveguide device.
Figure 9B:
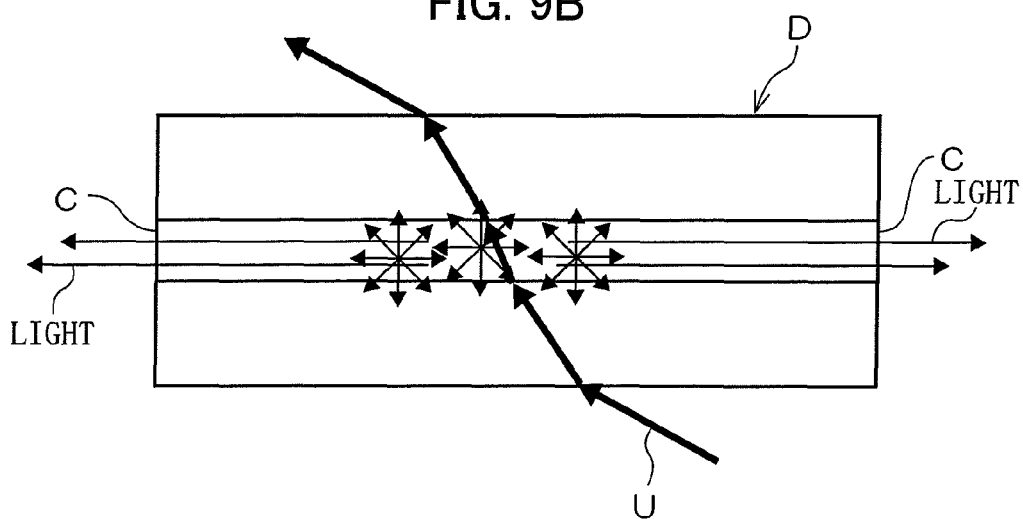
FIGS. 9B and 9C are drawings schematically showing cases in which ultraviolet light is illuminated onto an optical waveguide device.
Figure 9C:
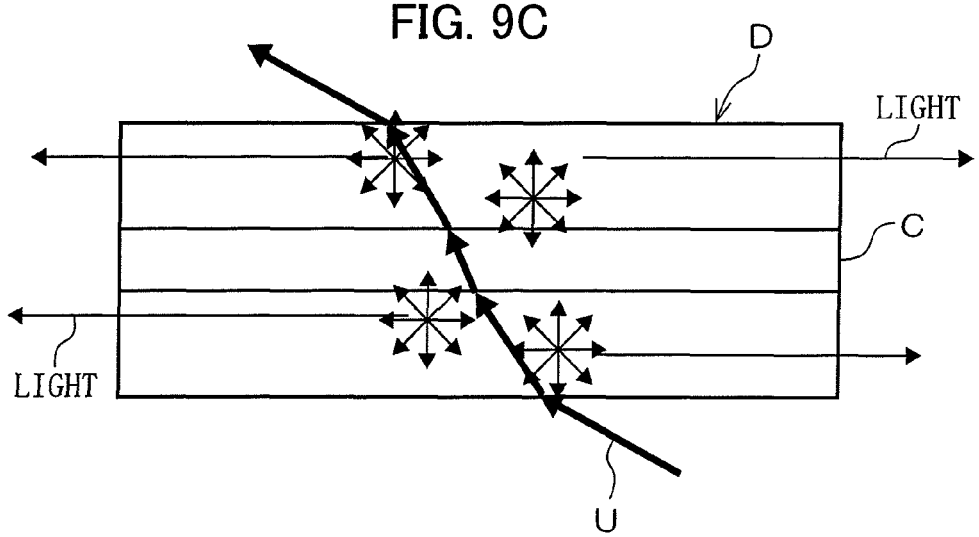

The relationship between an optical waveguide device and light that is illuminated onto the optical waveguide device is shown schematically in FIGS. 9A through 9C. As is shown in FIG. 9A, an optical waveguide device D is usually transparent with respect to visible light L in addition to the wavelength region of propagated signal light. Light, other than the light which is incident along the same optical axis as signal light from signal light incident/exiting portions C, passes through the optical waveguide device D while being refracted at the boundary of the refractive index, and passes through to the exterior of the optical waveguide device D as is. Therefore, even if the signal light incident/exiting portions C of the optical waveguide device D are picked-up, if the visible light L is illuminated without being conscious of the optical axis of the signal light, there is little light that reaches the signal light incident/exiting portions C, and it is difficult to recognize the positions of the signal light incident/exiting portions C (the optical coupling positions).

On the other hand, a polymer optical waveguide device generally has absorption in the short wavelength region, and the polymer or polymerization initiator structuring the polymer optical waveguide device exhibits fluorescence upon illumination of ultraviolet light U. Therefore, even if the ultraviolet light U is illuminated from other than the optical axis of the signal light, the light, which is scattered or excited within the optical waveguide device D, propagates through the core portion (the waveguide portion) of the optical waveguide device D, and exits from the incident/exiting portions C of the signal light (refer to FIG. 9B).

Further, in cases in which the scattering or excitation at the cladding portion within the optical waveguide device D is dominant, light is made to exit from end portions of the optical waveguide device other than the incident/exiting portions C of the signal light (see FIG. 9C).

The present invention specifies the incident position of light by utilizing these characteristics of a polymer optical waveguide with respect to ultraviolet light.

An example of an exemplary embodiment of the present invention will be described hereinafter in detail with reference to the drawings.

(Structures of Optical Waveguide Device and Optical Elements)

First, a light-emitting section 12, which has a light-emitting element 12B serving as an optical element which is mounted by the optical element mounting method relating to the present invention, a light-receiving section 14 which has a light-receiving element 14B serving as an optical element, and an optical waveguide device 20 will be described.

As shown in FIG. 1, the optical waveguide device 20 has a rectangular-plate-shaped cladding portion 22. The cladding portion 22 is the portion forming the main body of the optical waveguide device 20, and can be structured by a transparent resin film or the like. A first mirror surface 24 and a second mirror surface 26 are structured at one end side and the other end side in the longitudinal direction of the cladding portion 22. The first mirror surface 24 and the second mirror surface 26 are structured by inclined surfaces which form angles of 45° with a top surface 22A of the cladding portion 22, and function as optical path changing surfaces which change the optical path of the light. Note that the 45° angles here may deviate by, for example, about ±10% in light of mechanical precision.

A first waveguide core 30 and a second waveguide core 32 which guide light are formed at the cladding portion 22 so as to be covered by the cladding portion 22. The first waveguide core 30 and the second waveguide core 32 are structured of a material having a higher refractive index than the cladding portion 22.

Figure 2A:
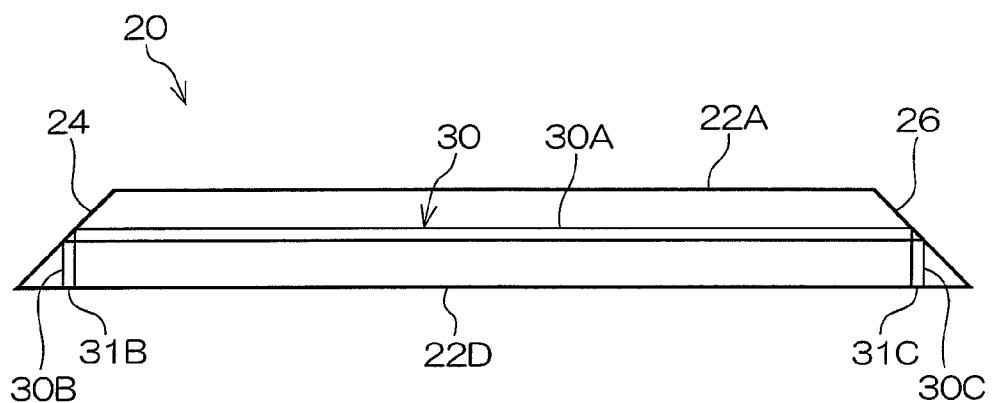
FIG. 2A is a cross-sectional view, in a longitudinal direction, of the polymer optical waveguide device of the present exemplary embodiment.
Figure 2B:
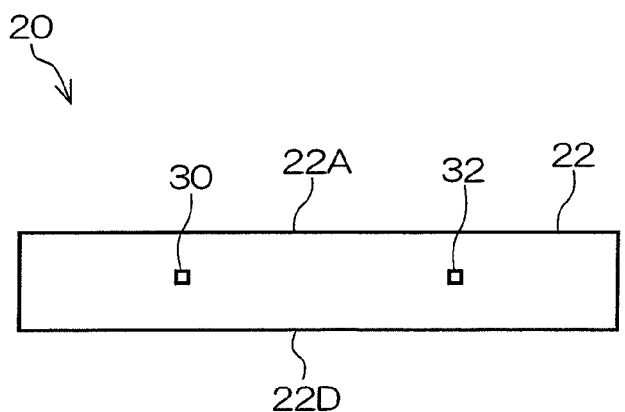
FIG. 2B is a cross-sectional view, in a short-side direction, of the polymer optical waveguide device of the present exemplary embodiment.

As shown in FIG. 2, the first waveguide core 30 is structured by a first upper waveguide core portion 30A which is disposed along the longitudinal direction of the cladding portion 22, and first end portion waveguide core portions 30B, 30C which are disposed in the direction of thickness of the cladding portion 22. One end of the first upper waveguide core portion 30A is disposed at the first mirror surface 24, and the other end of the first upper waveguide core portion 30A is disposed at the second mirror surface 26. One end of the first end portion waveguide core portion 30B is connected to the first upper waveguide core portion 30A at the first mirror surface 24, and the other end of the first end portion waveguide core portion 30B is disposed at a bottom surface 22D of the cladding portion 22. One end of the first end portion waveguide core portion 30C is connected to the first upper waveguide core portion 30A at the second mirror surface 26, and the other end of the first end portion waveguide core portion 30C is disposed at the bottom surface 22D of the cladding portion 22. The bottom surface 22D side end surface of the first end portion waveguide core portion 30B (hereinafter called "first incident end surface 31B") is an incident position of light. The bottom surface 22D side end surface of the first end portion waveguide core portion 30C (hereinafter called "first exiting end surface 31C") is an exiting position of light.

The second waveguide core 32 is disposed parallel to the first waveguide core 30, and has a second upper waveguide core portion 32A and second end portion waveguide core portions 32B, 32C, which correspond to the first upper waveguide core portion 30A and the first end portion waveguide core portions 30B, 30C, respectively. At the second waveguide core 32, the bottom surface 22D side end surface of the second end portion waveguide core portion 32B (hereinafter called "second exiting end surface 33B") is an exiting position of light. The bottom surface 22D side end surface of the second end portion waveguide core portion 32C (hereinafter called "second incident end surface 33C") is an incident position of light.

The first end portion waveguide core portions 30B, 30C and the second end portion waveguide core portions 32B, 32C can be omitted. The signal light, which passes through the incident end surfaces 31B, 33B and the exiting end surfaces 31C, 33C and is incident and exits at this time, propagates freely in the direction of thickness of the cladding portion 22, and is coupled to the first waveguide core 30 and the second waveguide core 32 via the mirror surfaces 24 and 26.

One or both longitudinal direction end portions of the optical waveguide device 20 may be structured so as to form 90° angles with a top surface 22A of the cladding portion 22. The light incident/exiting positions at this time are the end portions of the first waveguide core 30A and the second waveguide core 32A.

The optical waveguide device 20 of the present exemplary embodiment can be manufactured by using any of various methods, such as, for example, a replicating method utilizing a mold which uses a silicone resin, a method using a stamper, a method utilizing cutting which uses a dicing saw, a direct photopatterning process, or the like. Further, the mirror surface 24 can be structured by cutting by using a dicing saw having a 45° angle blade.

Note the first waveguide core 30 and the second waveguide core 32 can be formed by using a curing resin. Resins such as radiation curing resins, electron beam curing resins, heat curing resins, and the like can be used as the curing resin, and thereamong, ultraviolet curing resins and heat curing resins are preferably used. Ultraviolet curing or heat curing monomers, oligomers, or mixtures of monomers and oligomers are preferably used as the ultraviolet curing resin or head curing resin. Further, epoxy ultraviolet curing resins, polyimide ultraviolet curing resins and acrylic ultraviolet curing resins are preferably used as the ultraviolet curing resin.

The cladding portion 22 as well can be formed by using a curing resin. Examples of the film for the cladding portion 22 include a layer formed by coating and curing a curing resin, a polymer film obtained by coating and drying a solvent solution of a polymer material, and the like. Ultraviolet curing resins and heat curing resins are preferably used as the curing resin. For example, ultraviolet curing or heat curing monomers, oligomers, or mixtures of monomers and oligomers can be used.

As shown in FIG. 1, the light-emitting section 12 has a base material 12A and the light-emitting element 12B. In the present exemplary embodiment, a surface emitting laser (VCSEL: Vertical Cavity Surface Emitting Laser), at which plural light-emitting points which emit laser light are arrayed two-dimensionally, is used as the light-emitting element 12B. Note that the light-emitting element is not limited to a surface emitting laser, and an LED or another light-emitting element can be used.

The light-receiving section 14 has a substrate 14A and the light-receiving element 14B. In the present exemplary embodiment, an example in which a photodiode is used as the light-receiving element 14B is described. However, the light-receiving element is not limited to a photodiode, and a CCD or another light-receiving element can be used.

(Optical Element Mounting Device)

Figure 3:
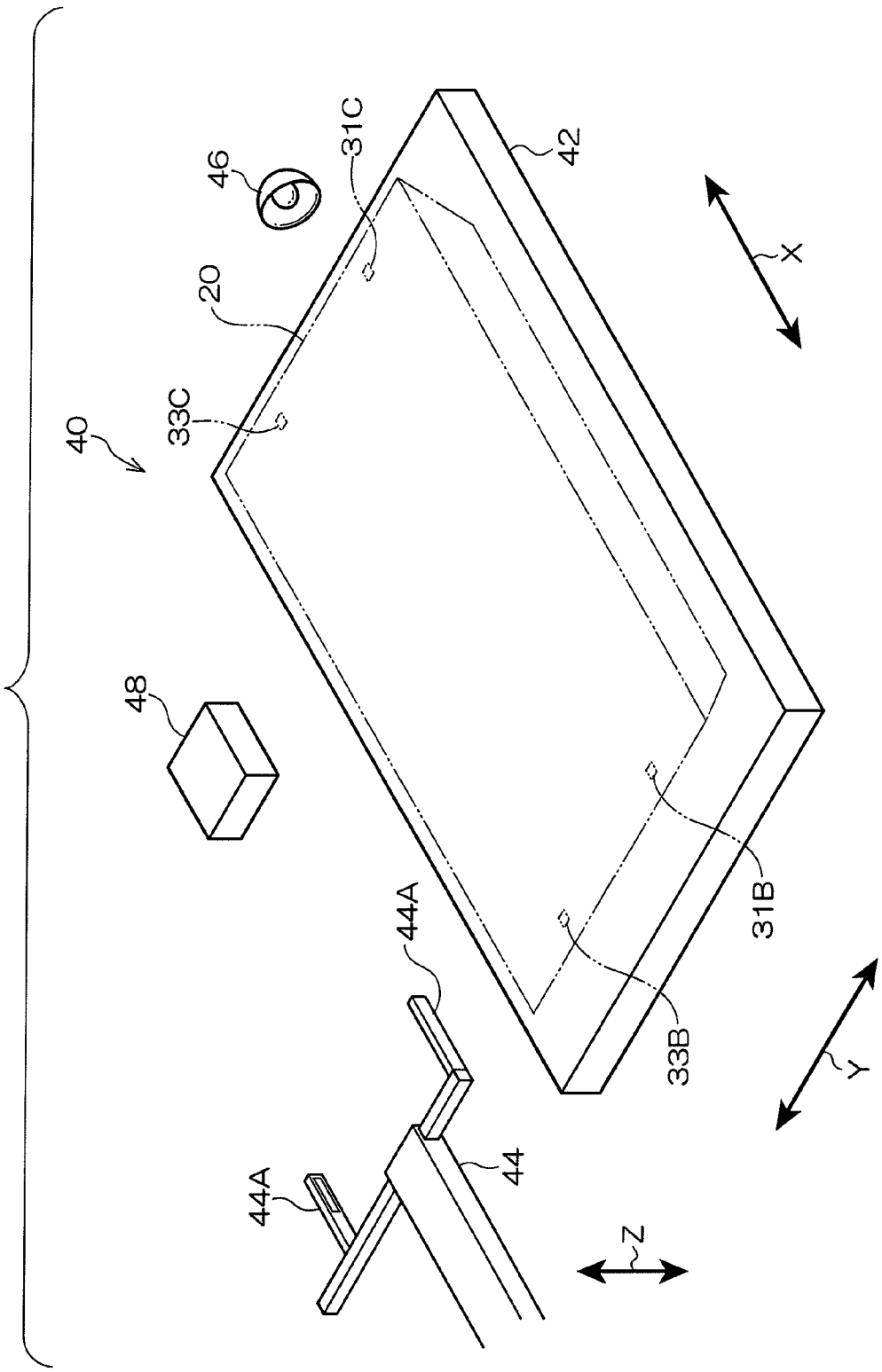
FIG. 3 is a schematic drawing of an optical element mounting device of the present exemplary embodiment.

The optical element mounting method of the present invention can be implemented at an optical element mounting device 40 shown in FIG. 3. The optical element mounting device 40 has a stage 42, a conveying/mounting section 44, an ultraviolet light illuminating section 46, and an image pickup device 48.

The stage 42 is formed in the shape of a rectangular plate, and is movable in a longitudinal direction X and a short-side direction Y of the rectangle. The conveying/mounting section 44 is disposed above the stage 42, and, with arms 44A, can hold a member from the outer sides in the short-side direction Y. The conveying/mounting section 44 as well is movable in the longitudinal direction X and the short-side direction Y, and further, is also movable in a thickness direction Z of the stage 42.

To hold the light-emitting section 12 and the light-receiving section 14 by the conveying/mounting section 44, in addition to the method shown in FIG. 3 of nipping the side surfaces, there is also a method of vacuum-suctioning the electronic part by suctioning nozzles.

The ultraviolet light illuminating section 46 is disposed above the stage 42 so as to be separated from the top surface of the stage 42. The ultraviolet light illuminating section 46 can emit ultraviolet light toward the stage 42, such that the optical axis is parallel to the stage surface. Note that the ultraviolet light exiting from the ultraviolet light illuminating section 46 does not necessarily have to be illuminated at the aforementioned angle, and it is preferable that the angle formed by the optical axis of the image pickup device 48 and the optical axis of the ultraviolet light illuminating section 46 is within the range of 0° to 90°. This is in order to suppress entry, into the light-receiving portion of the image pickup device 48, of the light which is reflected at fixtures which are attached to the optical waveguide device 20. Further, the ultraviolet light here is preferably near ultraviolet light of a wavelength of 200 nm to 380 nm. This is in order to prevent far ultraviolet light of a wavelength of less than 200 nm from damaging the optical waveguide device 20.

Any type of light source, at which ultraviolet light of the aforementioned wavelength region is the main component, can be used as the light source of the ultraviolet light illuminating section 46. For example, a discharge lamp, an LED, or the like can be used.

A discharge lamp, such as a high-pressure mercury lamp or a metal halide lamp or the like, can illuminate light of a broad spectrum having plural wavelength peaks, and therefore, can be adapted to optical waveguide devices structured by a broad range of materials. Note that, if a discharge lamp is used, in order to suppress deformation (changes in the dimensions) of the optical elements due to the heat rays, it is preferable to use a discharge lamp equipped with a heat ray cutting filter.

By using an LED as the light source of the ultraviolet light illuminating section 46, damage to the polymer optical waveguide device 20 due to short-wavelength ultraviolet light can be prevented. Further, deformation (changes in the dimensions) of the optical elements due to heat rays also can be prevented.

The image pickup device 48 is disposed above the stage 42 so as to be separated from the top surface of the stage 42, and such that the optical axis thereof forms an angle of approximately 90° with the stage surface. A digital microscope using a CCD image pickup element sensitive to visible light, or the like, can be used as the image pickup device 48.

(Optical Mounting Method)

A method of mounting an optical element by using the optical element mounting device 40 will be described next.

Figure 4A:
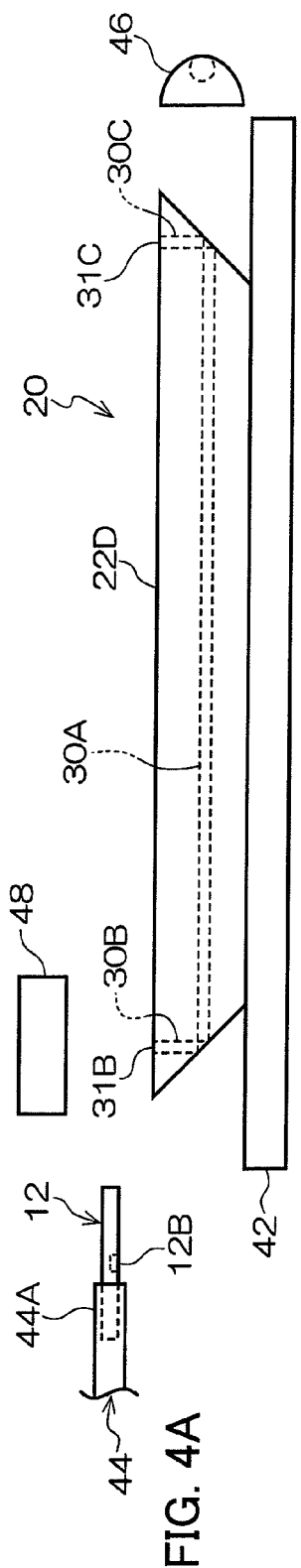
FIGS. 4A through 4C are drawings explaining mounting procedures at the optical element mounting device of the present exemplary embodiment.

As shown in FIG. 4A, the optical waveguide device 20 is placed on the stage 42 such that the mounting surface (the bottom surface 22D) thereof is at the upper side. Further, the light-emitting section 12 is held by the conveying/mounting section 44 such that the light-emitting element 12B faces the stage 42.

Figure 5A:
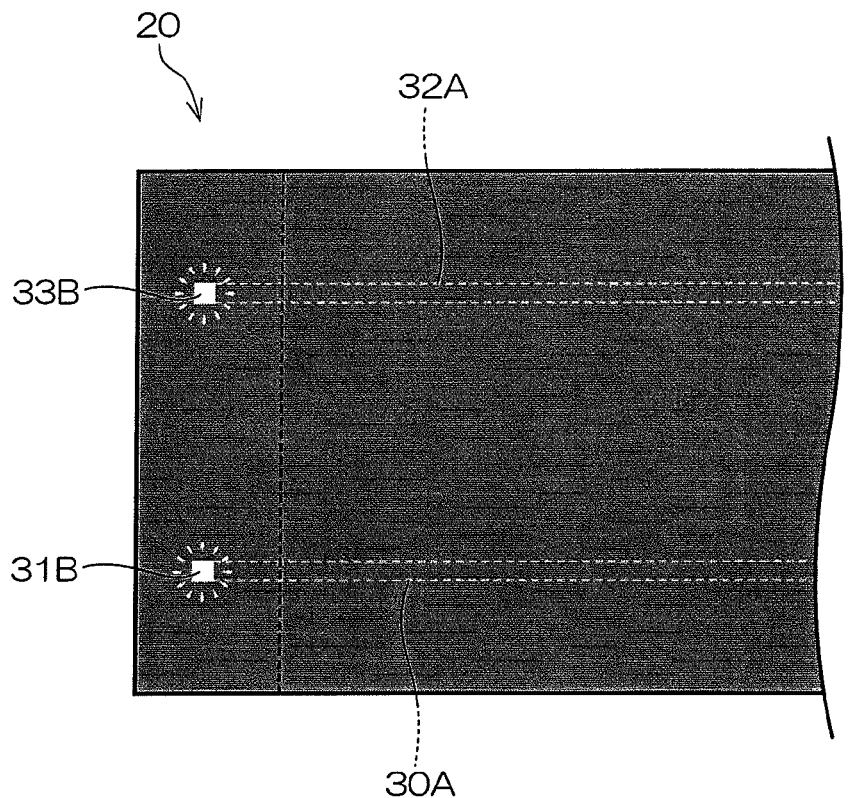
FIGS. 5A and 5B are drawings showing incident/exiting positions at the time when ultraviolet light is illuminated onto the polymer optical waveguide device of the present exemplary embodiment.

The ultraviolet light illuminating section 46 is driven, and illuminates ultraviolet light toward the optical waveguide device 20 on the stage 42. Then, the image pickup device 48 is moved in the X-Y directions, and carries out capturing such that the portion where the incident end surface 31B is formed is included. Here, the ultraviolet light that is illuminated is scattered or excited within the first waveguide core 30 and exhibits fluorescence, and exits from the incident end surface 31B of the first waveguide core 30. Accordingly, this light which exits can be captured as a portion in the image where the brightness is high (a bright portion) (see FIG. 5A), and the position of the incident end surface 31B can be recognized easily. When recognition has been made, the image pickup device 48 is fixed, and the position of the incident end surface 31B on the stage 42 is stored.

Figure 4B:
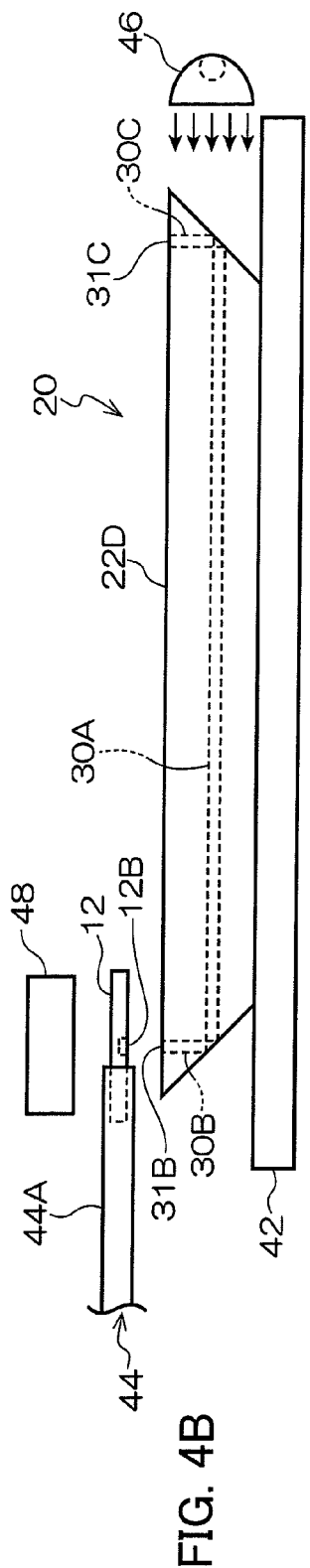

Next, the conveying/mounting section 44 is driven, and moves the light-emitting section 12 between the image pickup device 48 and the optical waveguide device 20. Then, the position of the light-emitting element 12B of the light-emitting section 12 is captured by the image pickup device 48 which was fixed as described above, and the conveying/mounting device 44 is moved in the X-Y directions so that the incident end surface 31B of the first waveguide core 30 and the position of the light-emitting element 12B coincide with one another (see FIG. 4B).

Figure 4C:
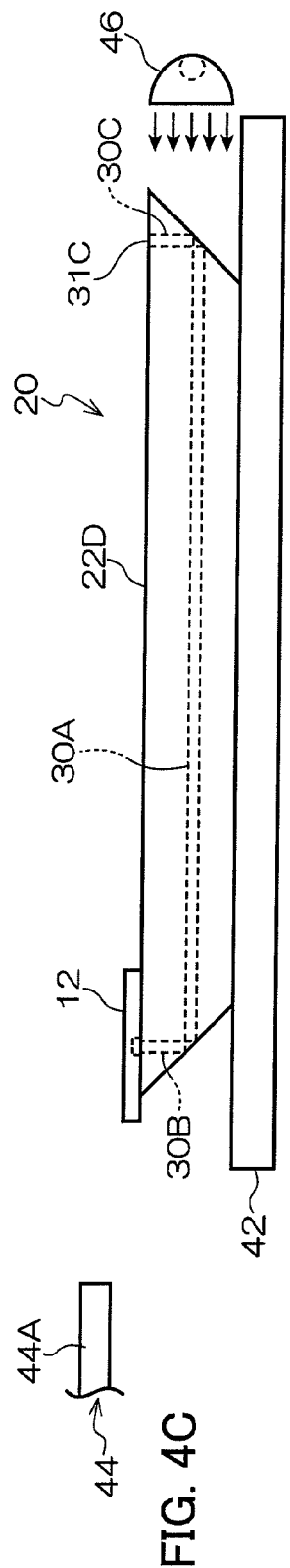

At the place where the incident end surface 31B and the position of the light-emitting element 12B coincide, the conveying/mounting section 44 is moved downward in the Z direction and mounts the light-emitting section 12 to the optical waveguide device 20 (see FIG. 4C).

In the same way, the position of the exiting end surface 31C is recognized, the light-receiving element 14B and the exiting end surface 31C are made to coincide with one another, and the light-receiving section 14 is mounted. Further, the light-emitting section 12 can be mounted to the incident end surface 33C in the same way, and the light-receiving section 14 can be mounted to the exiting end surface 33B in the same way.

In the present exemplary embodiment, light exits from the incident/exiting end surfaces of the first waveguide core 30 and the second waveguide core 32, and the accurate positions of the incident/exiting end surfaces can be recognized by using the image pickup device 48.

Figure 5B:
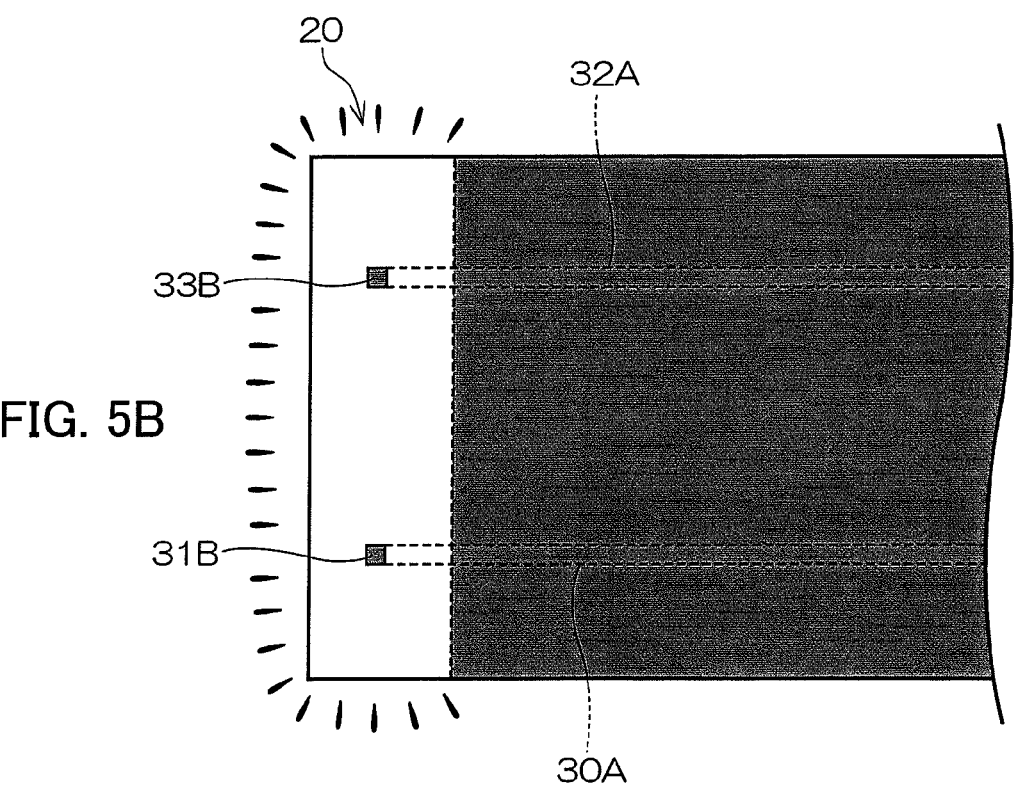

On the other hand, if the scattering and excitation due to the illumination of the ultraviolet light occur mainly at the cladding portion 22, a portion in the image where the brightness is low (a dark portion, see FIG. 5B) is made to be the position of the incident end surface, and, other than that, optical elements can be mounted by a method similar to that described above.

Note that the recognition of the respective incident/exiting end surfaces of the first incident end surface 31B and the like after capturing, by the image pickup device 48, the optical waveguide device 20 under ultraviolet light illumination, and the placement and mounting of the light-emitting sections 12 and the light-receiving sections 14 at the recognized positions, may be carried out automatically. Hereinafter, a case in which high-brightness portions are the incident/exiting positions will be described as an example.

Figure 6:
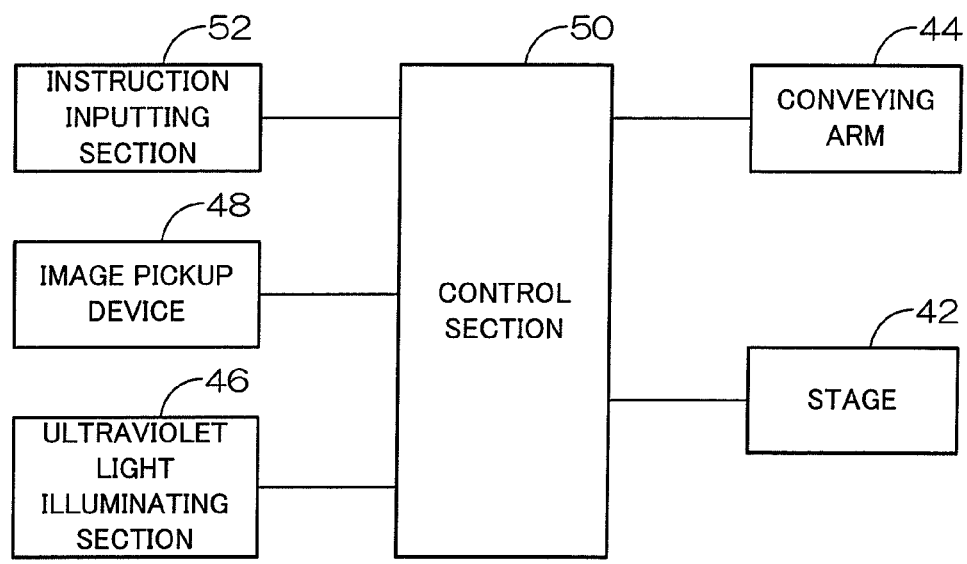
FIG. 6 is a schematic block diagram of a modified example of the optical element mounting device of the present exemplary embodiment.

When carrying out the aforementioned recognizing and placement and mounting automatically, as shown in FIG. 6, the optical element mounting device further has a control section 50 and an instruction inputting section 52. The control section 50 is connected to the instruction inputting section 52, the image pickup device 48, the ultraviolet light illuminating section 46, the stage 42, and the conveying/mounting section 44. The instruction inputting section 52 is an operating section for a user to input various types of instructions, and instructions for driving the image pickup device 48, the ultraviolet light illuminating section 46, the stage 42 and the conveying/mounting section 44 can be inputted thereby. The control section 50 is structured to include a CPU, a ROM, a RAM, and the like. Various programs and the like for executing overall control of the optical element mounting device 40, recognizing g processing of the incident/exiting end surfaces, and the like, are stored in the control section 50.

Figure 7:
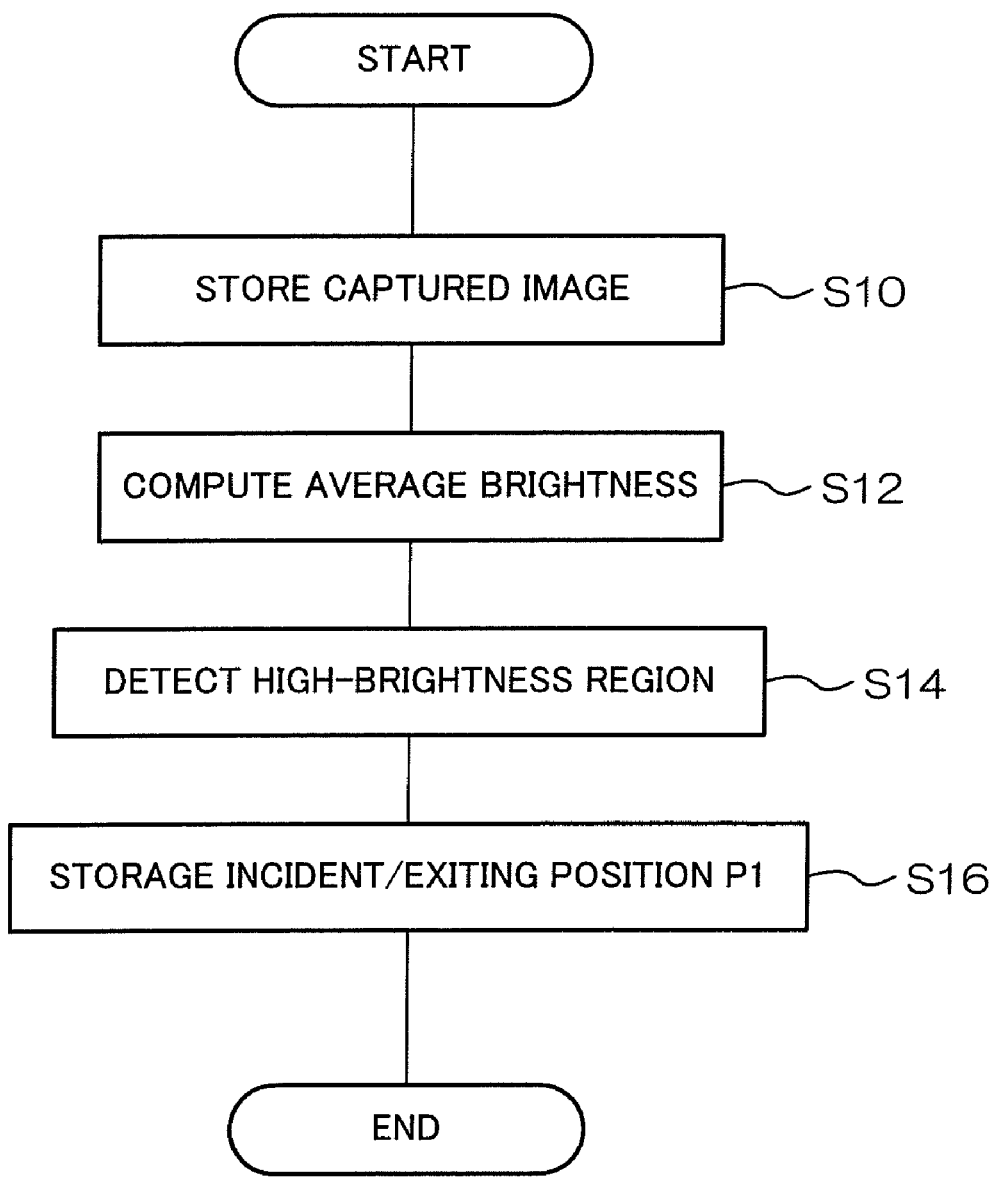
FIG. 7 is a flowchart of processing of recognizing an incident/exiting end surface.

After the optical waveguide device 20 captured by the image pickup device 48 under ultraviolet light illumination, when an instruction to start recognition processing of the incident/exiting end surface is inputted from the instruction inputting section 52, the incident/exiting end surface recognizing processing shown in FIG. 7 is started at the control section 50.

First, in step S10, the captured image is stored, and, in step S12, the average brightness of the stored image is computed. In step S14, a region, which is greater than or equal to a predetermined size and whose brightness is a predetermined value or more greater than the average brightness, is detected as a high-brightness region. The portion detected here is judged to be an incident/exiting end surface, and, in step S16, the detected position is stored as incident/exiting end surface position P1. In this way, the incident/exiting end surface position can be recognized (judged).

Figure 8:
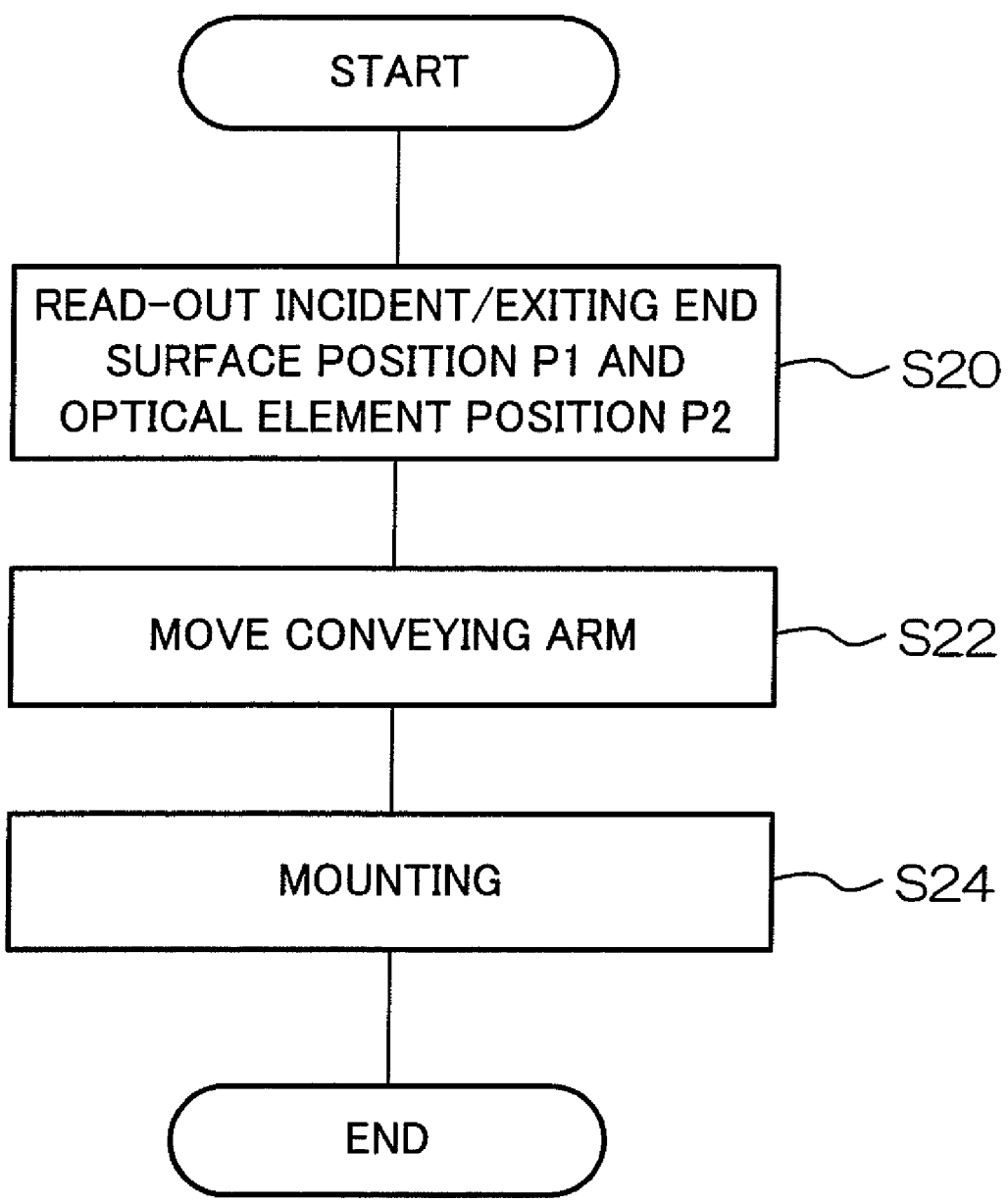
FIG. 8 is a flowchart of mounting processing.

Next, the mounting processing shown in FIG. 8 is executed. In the present exemplary embodiment, the mounting processing is started after a mounting processing start instruction is inputted from the user. Before this mounting processing start instruction is inputted, the light-emitting section 12 or the light-receiving section 14, which is held by the conveying/mounting section 44, is captured by the image pickup device 48, and the position of the light-emitting element 12B or the position of the light-receiving element 14B (optical element position P2) is stored. When the mounting processing start instruction is inputted, first, in step S20, the incident/exiting end surface position P1 and the optical element position P2 are read-out. In step S22, the conveying/mounting section 44 is moved to the position at which the incident/exiting end surface position P1 and the optical element position P2 overlap one another in the X-Y plane. In step S24, the conveying/mounting section 44 is moved downward in the Z direction, and the light-emitting section 12 or the light-receiving section 14 is mounted on the optical waveguide device 20.

In this way, an optical element can be automatically mounted to the optical waveguide device 20.

Note that, in the above-described exemplary embodiment, mounting is carried out by the optical waveguide device 20 being placed on the stage 42 of the optical element mounting device 40 and the optical element being moved while being held by the conveying/mounting section 44. However, mounting may be carried out by the optical element being placed on the stage 42 and the optical waveguide device 20 being moved while being held by the conveying/mounting section 44.

An optical element mounting method of a first aspect of the present invention is an optical element mounting method that mounts an optical element structured so as to include at least one of a light-emitting element and a light-receiving element to a polymer optical waveguide device having a waveguide core that guides light and a cladding portion surrounding the waveguide core, the method including: illuminating ultraviolet light onto the polymer optical waveguide device; in a state in which the ultraviolet light is illuminated, capturing, by an image pickup device, the polymer optical waveguide device including a light incident/exiting position of the waveguide core; and judging, from a difference between bright and dark in a captured image, that a portion brighter than other portions or a portion darker than other portions is the light incident/exiting position of the waveguide core, and placing at least one of the light-emitting element and the light-receiving element at the light incident/exiting position of the waveguide core, and mounting the optical element.

In the optical element mounting method of the first aspect of the present invention, ultraviolet light is illuminated onto the polymer optical waveguide device at which the waveguide core is formed. The illuminated ultraviolet light is scattered or excited within the polymer optical waveguide device, and propagates through the waveguide core and the cladding portion surrounding the waveguide core, and exits from an end portion of the waveguide which includes the light incident/exiting position. In a case in which the scattering and excitation due to the illumination of the ultraviolet light occur mainly at the material forming the waveguide core portion, the light due to this scattering and exciting is emitted from the light incident/exiting position of the waveguide core end portion. On the other hand, in a case in which the scattering and excitation due to the illumination of the ultraviolet light occur mainly at the waveguide cladding portion, the light is emitted from the waveguide end portion except for the light incident/exiting position. Thus, under the ultraviolet light illumination, the polymer optical waveguide device including this incident/exiting position is captured by the image pickup device. By capturing the exiting light by the image pickup device, a portion which is brighter than or a portion which is darker than other portions in the captured image can be judged as the incident/exiting position.

Note that the optical element mounting method of the first aspect of the present invention may have the feature that the angle formed by the optical axis of the ultraviolet light and the optical axis of the image pickup device is 0° to 90°.

In order to suppress entry, into the image pickup device, of the light which is reflected at fixtures which are attached to the optical waveguide device, it is preferable that the angle formed by the optical axis of the ultraviolet light and the optical axis of the image pickup device is 0° to 90°.

Further, an optical element mounting device of a second aspect of the present invention has: a light illuminating section illuminating ultraviolet light onto a polymer optical waveguide device which has a waveguide core that guides light and a cladding portion surrounding the waveguide core; and an image pickup section capturing the polymer optical waveguide device including a light incident/exiting position of the waveguide core.

In the optical element mounting device of the second aspect of the present invention, the polymer optical waveguide device is illuminated by ultraviolet light from the light illuminating section, and the polymer optical waveguide device, including the light incident/exiting position of the waveguide core, is captured by the image pickup device. In this way, the light which exits from the light incident/exiting position of the waveguide core in the captured image, or the light which exits from the portion other than the light incident/exiting position of the waveguide core, can be recognized.

Note that the optical element mounting device of the second aspect of the present invention may have the feature of having judging means judging that the light incident/exiting position of the waveguide core is disposed at a portion which is brighter (darker) than other portions in the image captured by the image pickup device, and mounting means mounting a light-emitting element or a light-receiving element at the light incident/exiting position of the waveguide core judged by the judging means.

EXAMPLES

A ceramic package is prepared at which a laser diode and a photodiode are fixed, as the light-emitting section 12 and the light-receiving section 14 in the above-described exemplary embodiment, with the distance between the light-receiving point and the light-emitting point being 500 µm. Further, a polymer optical waveguide device is prepared which is formed of an epoxy resin, and has two cores which are embedded in parallel at an interval of 500 µm, and has, at one end in the light propagating direction, an optical path changing function in accordance with a 45° inclined surface.

The above-described ceramic package is placed on a mounting stage of an optical element mounting device whose mounting accuracy in an unloaded condition is ±1 µm. Further, the optical waveguide device is attached to the conveying/mounting section of the optical element mounting device such that the signal light exiting portion in accordance with the 45° inclined surface of the above-described polymer optical waveguide device is at the mounting stage side. Ultraviolet light, whose light source is a high-pressure mercury lamp, is illuminated onto the optical waveguide device. At this time, the ultraviolet light is illuminated parallel to a plane which includes the two waveguide cores of the optical waveguide device, and at a 30° angle with respect to the direction in which the waveguide cores extend, and from a position at which the distance of the light guide from the optical waveguide device is 40 mm.

The core portion of the 45° inclined surface of the optical waveguide device is picked-up clearly by the image pickup device which looks out upon the conveying/mounting section. The optical waveguide device is moved such that the core portion and the laser diode light-emitting point are at the same position, and mounting is carried out.

The offset of the optical waveguide device from the ideal position of the light-receiving/emitting element is 2 µm, and a good optical connection is confirmed.

What is claimed is:

1. An optical element mounting method that mounts an optical element structured so as to include at least one of a light-emitting element and a light-receiving element to a polymer optical waveguide device having a waveguide core that guides light and a cladding portion surrounding the waveguide core, the method comprising:
    illuminating ultraviolet light onto the polymer optical waveguide device;
    under the ultraviolet light illumination, capturing, by an image pickup device, an image of a portion of the polymer optical waveguide device including a light incident/exiting position of the waveguide core; and
    judging, from a difference between bright and dark in the captured image, that a portion brighter than other portions or a portion darker than other portions is the light incident/exiting position of the waveguide core, placing at least one of the light-emitting element and the light-receiving element at the light incident/exiting position of the waveguide core, and mounting the optical element.

2. The optical element mounting method of claim 1, wherein an angle formed by an optical axis of the ultraviolet light and an optical axis of the image pickup device is 0° to 90°.

3. The optical element mounting method of claim 1, wherein a light-emitting element that emits the ultraviolet light is a discharge lamp.

4. The optical element mounting method of claim 2, wherein a light-emitting element that emits the ultraviolet light is a discharge lamp.

5. The optical element mounting method of claim 1, wherein a light-emitting element that emits the ultraviolet light is a light-emitting diode.

6. The optical element mounting method of claim 2, wherein a light-emitting element that emits the ultraviolet light is a light-emitting diode.

7. The optical element mounting method of claim 1, wherein a wavelength of the ultraviolet light is between approximately 200 nm and approximately 380 nm.

8. An optical element mounting device comprising:
    a light illuminating section that illuminates ultraviolet light onto a polymer optical waveguide device comprising a waveguide core that guides light and a cladding portion surrounding the waveguide core; and
    an image pickup section that captures an image of a portion of the polymer optical waveguide device including a light incident/exiting position of the waveguide core.

9. The optical element mounting device of claim 8, further comprising:
    a judging section that judges, from a difference between bright and dark in the captured image, that the light incident/exiting position of the waveguide core is disposed at a portion brighter than other portions or a portion darker than other portions; and a mounting section mounts a light-emitting element or a light-receiving element at the light incident/exiting position of the waveguide core judged by the judging section.

10. The optical element mounting device of claim 8, wherein a wavelength of the ultraviolet light is between approximately 200 nm and approximately 380 nm.

11. The optical element mounting device of claim 9, wherein a wavelength of the ultraviolet light is between approximately 200 nm and approximately 380 nm.

12. The optical element mounting device of claim 8, wherein an angle formed by an optical axis of the ultraviolet light and an optical axis of the image pickup section is 0° to 90°.

13. The optical element mounting device of claim 9, wherein an angle formed by an optical axis of the ultraviolet light and an optical axis of the image pickup section is 0° to 90°.

14. A method of identifying a light incident/exiting position of a waveguide core within a polymer optical waveguide device, wherein the polymer optical waveguide device comprises the waveguide core that guides light and a cladding portion surrounding the waveguide core, the method comprising:
    illuminating ultraviolet light onto the polymer optical waveguide device;
    under the ultraviolet light illumination, capturing an image of a portion of the polymer optical waveguide device including the light incident/exiting position of the waveguide core; and
    judging, from a difference between bright and dark in the captured image, that a portion brighter than other portions or a portion darker than other portions is the light incident/exiting position of the waveguide core.

* * * * *